(12) United States Patent
Koido

(10) Patent No.: US 9,116,783 B2
(45) Date of Patent: Aug. 25, 2015

(54) BUS CONNECTION CIRCUIT, SEMICONDUCTOR DEVICE AND OPERATION METHOD OF BUS CONNECTION CIRCUIT FOR MAKING PROCEDURE FOR SWITCHING BETWEEN A 1-CYCLE TRANSFER AND A 2-CYCLE TRANSFER UNNECESSARY

(71) Applicant: Renesas Electronics Corporation, Kawasaki-shi, Kanagawa (JP)

(72) Inventor: Yasuhiro Koido, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 189 days.

(21) Appl. No.: 13/659,183

(22) Filed: Oct. 24, 2012

(65) Prior Publication Data
US 2013/0103869 A1    Apr. 25, 2013

(30) Foreign Application Priority Data
Oct. 25, 2011    (JP) .................................. 2011-233589

(51) Int. Cl.
*G06F 13/00*    (2006.01)
(52) U.S. Cl.
CPC ...................... *G06F 13/00* (2013.01)
(58) Field of Classification Search
CPC ...................................................... G06F 13/00

USPC .............................. 710/22, 110; 711/147, 148
See application file for complete search history.

(56) References Cited

U.S. PATENT DOCUMENTS

| | | | |
|---|---|---|---|
| 8,321,622 B2 * | 11/2012 | Nakamura et al. | 711/100 |
| 2007/0133281 A1 | 6/2007 | Fujita et al. | |
| 2008/0162807 A1 * | 7/2008 | Rothman et al. | 711/114 |

FOREIGN PATENT DOCUMENTS

| | | | |
|---|---|---|---|
| JP | 9204393 A | 8/1997 | |
| JP | 2006-146817 A | 6/2006 | |
| JP | 2007-164895 A | 6/2007 | |
| JP | 2008-146773 A | 6/2008 | |

OTHER PUBLICATIONS

Communication dated Jun. 2, 2015, issued by the Japan Patent Office in corresponding Japanese Application No. 2011-233589.

\* cited by examiner

*Primary Examiner* — Glenn A Auve
(74) *Attorney, Agent, or Firm* — Sughrue Mion, PLLC

(57) ABSTRACT

A bus connection circuit connects a bus master and a plurality of bus slaves. The bus connection circuit includes a mirror area access detecting circuit and a processing circuit. The mirror area access detecting circuit detects that the bus master accesses a mirror area of a first bus slave of the plurality of bus slaves, and output a detection signal based on a detection result. The processing circuit executes processing preset in correspondence to the detection result, to an area or data as an access object, based on the detection result.

18 Claims, 13 Drawing Sheets

BUS CONNECTION CIRCUIT, SEMICONDUCTOR DEVICE AND OPERATION METHOD OF BUS CONNECTION CIRCUIT FOR MAKING PROCEDURE FOR SWITCHING BETWEEN A 1-CYCLE TRANSFER AND A 2-CYCLE TRANSFER UNNECESSARY

CROSS REFERENCE

This application claims a priority on convention based on Japanese Patent Application No. 2011-233589. The disclosure thereof is incorporated herein by reference.

TECHNICAL FIELD

The present invention is related to a bus connection circuit in a semiconductor integrated circuit (LSI).

BACKGROUND ART

In recent years, an amount of data to be transferred by a bus in an LSI (Large Scale Integration) increases as a data amount to be handled in the LSI increases. Therefore, the technique in which data are transferred among bus slaves at a higher speed is demanded. In a conventional information processing apparatus, a data transfer among the slaves is carried out through a bus master. In this case, 2-cycle transfer of the data transfer from a source slave to the bus master and the data transfer from the bus master to a destination slave is carried out. Therefore, even if the transfer efficiency is improved, 2 transfer cycles are required at minimum.

As the technique for carrying out data transfer at higher speed, a technique of the 1-cycle transfer is disclosed in JP 2006-146817A (Patent Literature 1), in which data is directly transferred from the source slave to the destination slave without passing through the bus master.

FIG. 1 is a block diagram showing a circuit configuration of a memory control system in Patent Literature 1. As shown in FIG. 1, an LSI 100 is provided with a CPU 110, a memory controller (MEMC) 160 and a system bus 150. The CPU 110 is connected with the system bus 150. The memory controller 160 controls an external ROM 200 and an external DRAM 300. The memory controller 160 is connected with the external ROM 200 and the external DRAM 300 by an address bus 161 passing through common external terminals. In the same way, the memory controller 160 is connected with the external ROM 200 and the external DRAM 300 by a data bus 162 passing through common external terminals. Moreover, the memory controller 160 outputs a ROM control signal 163 to control the external ROM 200 through an independent external terminal. In the same way, the memory controller 160 outputs a DRAM control signal 164 to control the external DRAM 300 through an independent external terminal. These control signals 163 and 164 include the minimum signals necessary to control the general ROM and DRAM, and the external ROM 200 and the external DRAM 300 can be controlled independently by these signals according to the memory access from the CPU 110.

FIG. 2 is a block diagram showing a specific connection relation of the LSI 100, the external ROM 200, and the external DRAM 300 in the memory control system of Patent Literature 1. Here, the external ROM 200 is a page ROM of 16 Mbits (1 Mword×16 bits). The address bus 161 of 20 bits in width is provided as a 20-bit physical address just as it is. On the other hand, the external DRAM 300 is a 64-Mbit DRAM (4-Mword×16 bits). A column address is of 12 bits, and a row address is of 10 bits. Only the lower 12 bits on the address bus 161 are supplied as a physical address. Also, the data bus 162 is of 16 bits in width and is connected with both of the external ROM 200 and the external DRAM 300. The ROM control signal 163 is composed of signals of CS#, RD# and is independently connected with the external ROM 200. Also, in the same way, the DRAM control signal 164 is composed of signals of RAS#, LCAS#, UCAS#, WE#, and OE# and is independently connected with the external DRAM 300.

FIG. 3 is a diagram showing an example of a memory map of the memory control system in Patent Literature 1. As shown in FIG. 3, the external ROM 200 is mapped on the memory map from an address 0xF000_0000 to an address 0xFFFF_FFFF. Also, the external DRAM 300 is mapped on the memory map from an address 0x0000_0000 to an address 0x3FFF_FFFF. Here, to facilitate the explanation, it is supposed that initialization code to initialize a system is written in 64 KB from the address 0xF000_0000 to the address 0xF000_FFFF and instruction code to actually control the system is written in 1 MB from an address 0xF001_0000 to an address 0xF010_FFFF in the external ROM 200. Moreover, the instruction code copied from the external ROM 200 to the external DRAM 300 is only 1 MB of the above-mentioned instruction code which actually controls the system, and this instruction code is supposed to be described in memory-allocatable contents non-dependent to absolute address.

Next, in the memory control system of Patent Literature 1, the copying operation the instruction code from the external ROM 200 to the external DRAM 300 when the system starts will be described.

At first, when an initial reset such as power-on-reset from outside is carried out, the CPU 110 first fetches the instruction code in a memory space according to an internal reset vector. At this time, a non-volatile memory which can hold the instruction code in the initial state is only the ROM. Therefore, the reset vector of the CPU 110 points out the address 0xF000_0000 which is the head address of the external ROM 200, and it is supposed that the instruction code is written in the external ROM 200 in order from the address pointed out by the reset vector.

Therefore, after the reset cancellation, the CPU 110 accesses the external ROM 200 through the system bus 150 and the memory controller 160, and fetches the initialization code for initializing a system from the address 0xF000_0000 of the memory map in order. After the fetching of this initialization code, the CPU 110 implements the initialization of the system according to the contents of the initialization code. Here, an address to access the external ROM 200 and data read from the external ROM 200 are supplied to the external DRAM 300 at the same time, but do not affect any influence because the DRAM control signal 164 is asserted not to permit the access.

When the initialization of the system completes, the CPU 110 requests the memory controller 160 to copy the instruction code written in the external ROM 200 to the external DRAM 300. At this time point, the operation of the CPU 110 is implemented completely according to the instruction code fetched from the external ROM 200. Hereinafter, the copying procedure of the instruction code by the memory controller 160 will be described.

First, the CPU 110 sets to the memory controller 160, a first address 0xF001_0000 of the instruction code written in the external ROM 200 as a source address, a first address 0x0000_0000 of the external DRAM 300 as a destination address, and a total byte count (1 MB) of the instruction code to be copied as a transfer length. Here, the column address of the external DRAM 300 and lower 12 bits, corresponding to the column address, of the address of the external ROM 200 must be equal to each other to produce a replica of the instruction code. Therefore, it is supposed that the addresses are preset in such a manner that the lower 12 bits of the transfer addresses are equal to each other, or only lower 12 bits of either of the destination address or the source address is validated. The setting values are previously written in the external ROM 200 together with the instruction code, and the CPU 110 can set them to the memory controller 160 by reading from the external ROM 200.

When the above mentioned setting are complete, the CPU 110 instructs the start to the memory controller 160, so that the instruction code is copied from the external ROM 200 to the external DRAM 300 independent from the CPU 110.

The operation when the instruction code of the address 0xF001_1234 of the external ROM 200 is copied to the address 0x0000_1234 of the external DRAM 300 will be described.

FIG. 4 is a diagram showing timing charts when the instruction code is copied in the memory control system of Patent Literature 1. First, the memory controller 160 outputs the row address 0x001 for the external DRAM 300 onto the address bus 161 at the timing T2 and sets the row address valid by asserting RAS# at the timing T3. At this time, only lower 10 bits on the address bus 161 are valid. After that, the identical address 0x11234 for the external ROM 200 and the external DRAM 300 is outputted on the address bus 161 from the timing T4. As shown in FIG. 2, all of the 20 bits of the address bus 161 are validated to the external ROM 200, but only lower 12 bits corresponding to the column address are validated to the external DRAM 300. Therefore, in this case, the column address to the external DRAM 300 is 0x234.

Next, a read request from the address 0x11234 is issued to the external ROM 200 by asserting CS# and RD# at the timing T6. After a predetermined time, the external ROM 200 outputs read data onto the data bus 162. At this time, the memory controller 160 requests a write operation to the address 0x01234 by asserting UCAS#, LCAS#, and WE# to the external DRAM 300 at the timing T8. Thus, the instruction code on the data bus 162 is directly written in the external DRAM 300. Since then, the source address and the destination address are incremented and the read operation and the write operation for the instruction code are repeated in the same way.

When a DMA transfer completes, the memory controller 160 notifies a DMA transfer completion to the CPU 110. When receiving the DMA transfer complete notice, the CPU 110 branches to the first address 0x0000_0000 of the instruction code copied to the external DRAM 300. By this, the CPU 110 fetches the instruction code from the external DRAM 300 in order. Since this, the CPU 110 fetches the instruction code from only the external DRAM 300 so that the latency of the external memory access containing the fetching of the instruction code is reduced and the processing speed of the whole system can be sped up.

As a related technique, a non-volatile semiconductor memory device is disclosed in JP 2008-146773 A (Patent Literature 2). This non-volatile semiconductor memory device is provided with a first semiconductor chip containing a first memory and a second semiconductor chip containing a second memory. After starting an instruction for executing a read enable operation as a write enable operation in the second memory as a copy destination, the read enable operation is performed and the data of the first memory as a copy source is copied to the second memory.

Also, a non-volatile semiconductor memory device is disclosed in JP 2007-164895A (Patent Literature 3: corresponding U.S. Pat. No. 7,486,569B2). This non-volatile semiconductor memory device has a plurality of memory chips. In this non-volatile semiconductor memory device, after starting an instruction for executing a read enable operation as a write enable operation in the memory chip of a copy destination, the read enable operation is carried out when the data copy is carried out among the plurality of memory chips.

CITATION LIST

[Patent Literature 1] JP 2006-146817A
[Patent Literature 2] JP 2008-146773A
[Patent Literature 3] JP 2007-164895A

SUMMARY OF THE INVENTION

In a technique described in Patent Literature 1, bus transfer efficiency is reduced because a case of direct transfer from the external ROM to the external DRAM (1-cycle transfer) and a case of non direct transfer (e.g. 2-cycle transfer) are mixed. The reason is as follows. In order to execute the direct transfer from the external ROM to the external DRAM, for example, it is necessary that the CPU 110 sets to the memory controller 160, a first address 0xF001_0000 of the instruction code written in the external ROM 200 as a source address, a first address 0x0000_0000 written in the external DRAM 300 as a destination address, and a total byte count (1 MB) of the instruction code to be copied as a transfer length. Therefore, in the data read from the external ROM, if a case of direct transfer to the external DRAM (1-cycle transfer) and a case of non direct transfer (for example, 2-cycle transfer) are mixed, the setting of the memory controller becomes necessary to change the operation of the memory controller every time the direct transfer is carried out. Because such setting of the memory controller is overhead, the bus transfer efficiency reduces.

The technique is demanded in which the 1-cycle transfer is carried out without any addition operation such as the setting of the memory controller, even if the case of direct transfer (1-cycle transfer) and the case of non direct transfer (for example, 2-cycle transfer) are mixed.

The bus connection circuit of the present invention connects a bus master and a plurality of bus slaves. The bus connection circuit is provided with a mirror area access detecting circuit and a processing circuit. The mirror area access detecting circuit detects that the bus master accesses the mirror area of a first bus slave of the plurality of bus slaves and outputs a detection signal. The processing circuit executes preset processing corresponding to the detection result to an area or data as an access object based on the detection result.

A semiconductor device of the present invention is provided with a bus master, the plurality of bus slaves and a bus connection circuit. The bus connection circuit connects the bus master and the plurality of bus slaves.

An operation method of a bus connection circuit in the present invention is an operation method of a bus connection circuit which connects bus master and a plurality of bus slaves. The operation method of the bus connection circuit includes detecting that a bus master accesses a mirror area of a first bus slave of the plurality of bus slaves and outputting a detection signal; and executing preset processing corresponding to the detection result, to an area or data as an access object based on the detection result.

According to the present invention, even if a case of direct transfer and a case of non direct transfer are mixed, 1-cycle transfer is made possible without any addition setting such as setting of the memory controller.

DESCRIPTION OF EMBODIMENTS

Hereinafter, a bus connection circuit, a semiconductor device and an operation method of the bus connection circuit according to embodiments of the present invention will be described with reference to the attached drawings.

First Embodiment

The semiconductor device provided with the bus connection circuit according to a first embodiment of the present invention will be described.

Figure 1:
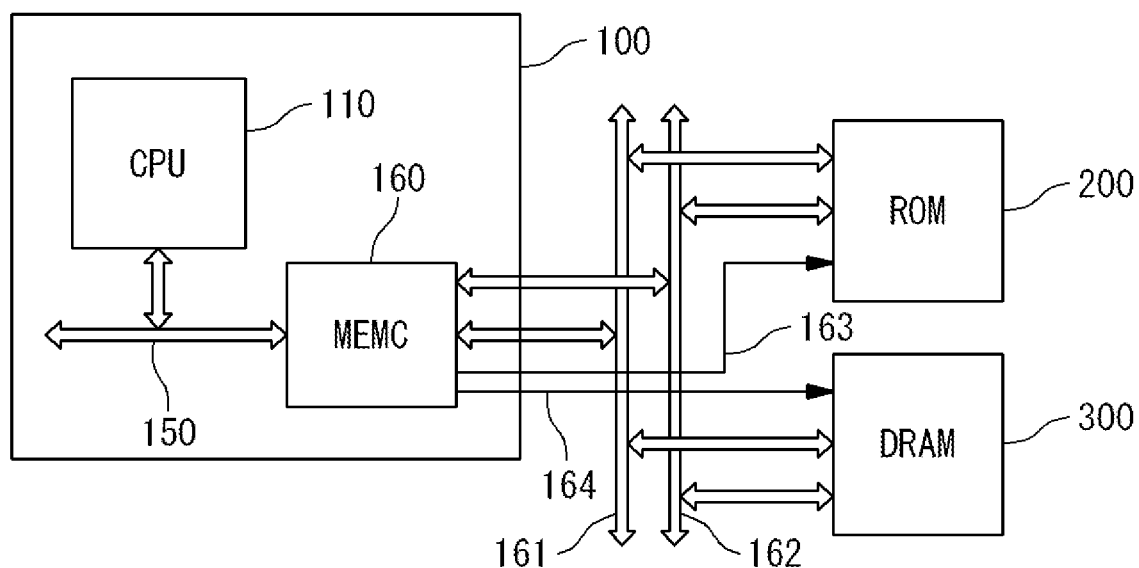
FIG. 1 is a block diagram showing a circuit configuration of a conventional memory control system.
Figure 2:
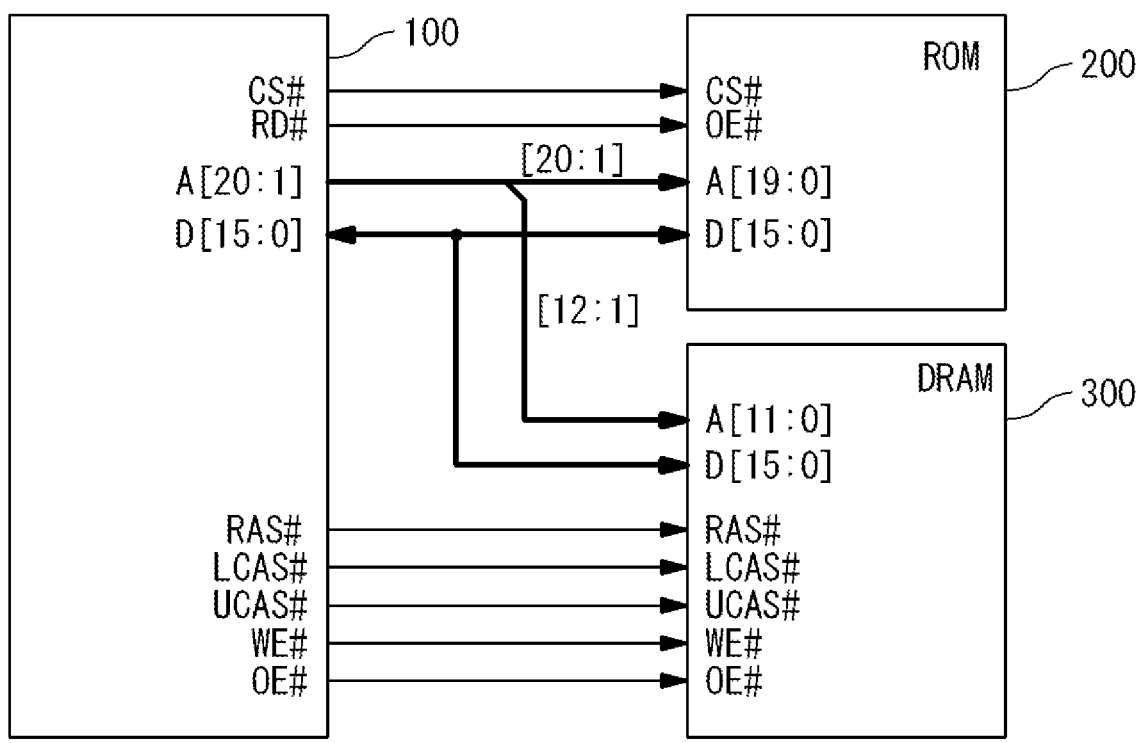
FIG. 2 is a block diagram showing a specific circuit configuration of a LSI, an external ROM and an external DRAM in the conventional memory control system.
Figure 3:
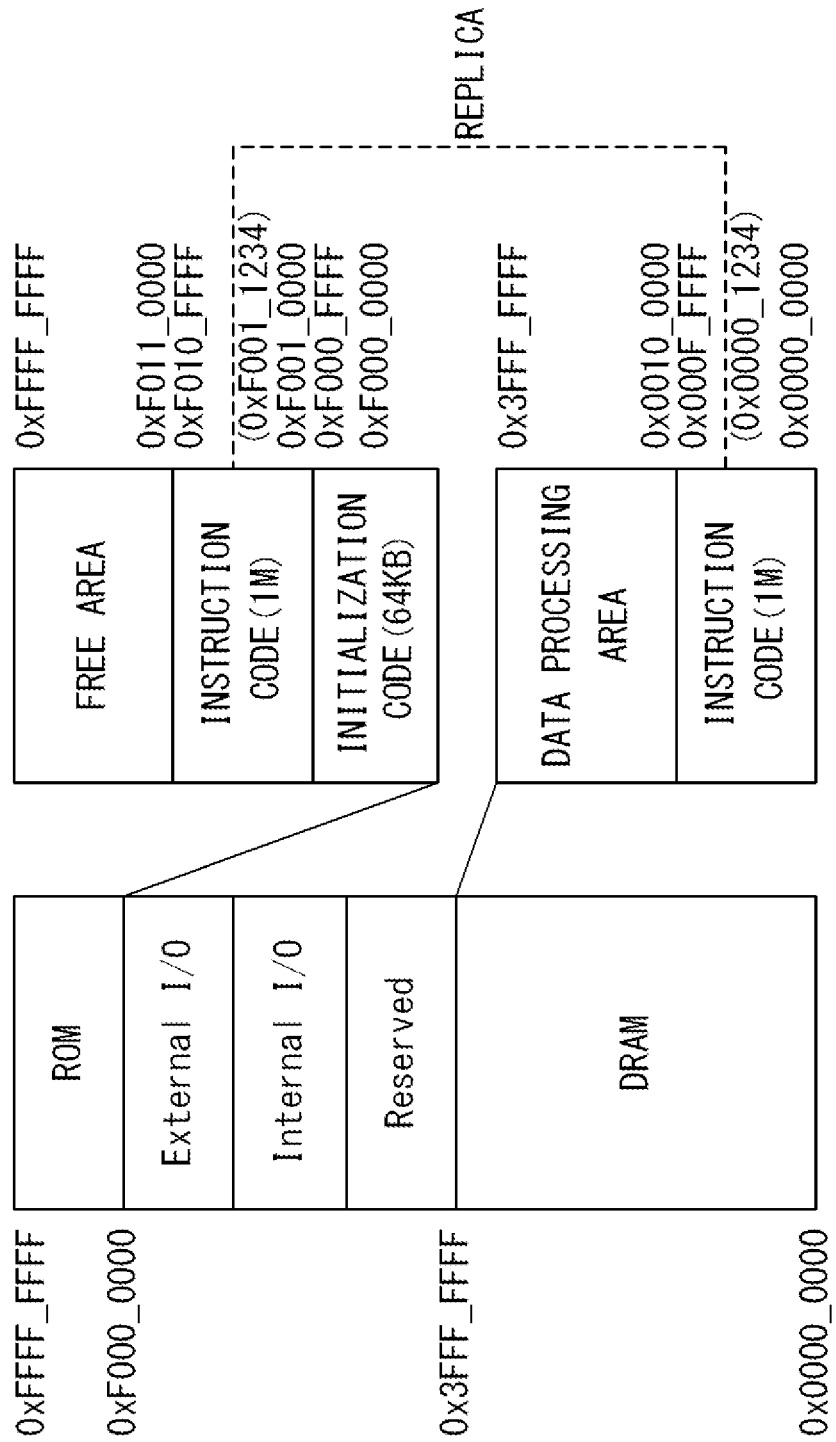
FIG. 3 is a diagram showing an example of a memory map of the conventional memory control system.
Figure 4:
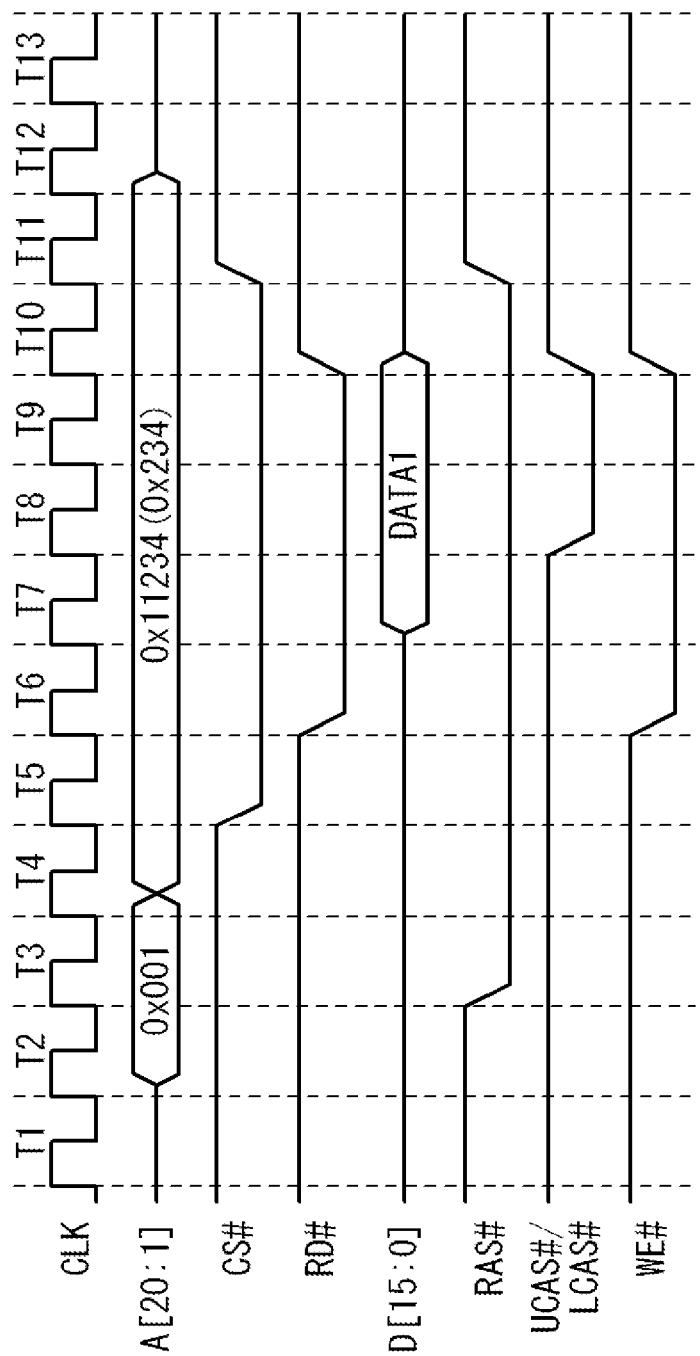
FIG. 4 is a diagram of timing charts when instruction code is copied in the conventional memory control system.
Figure 5:
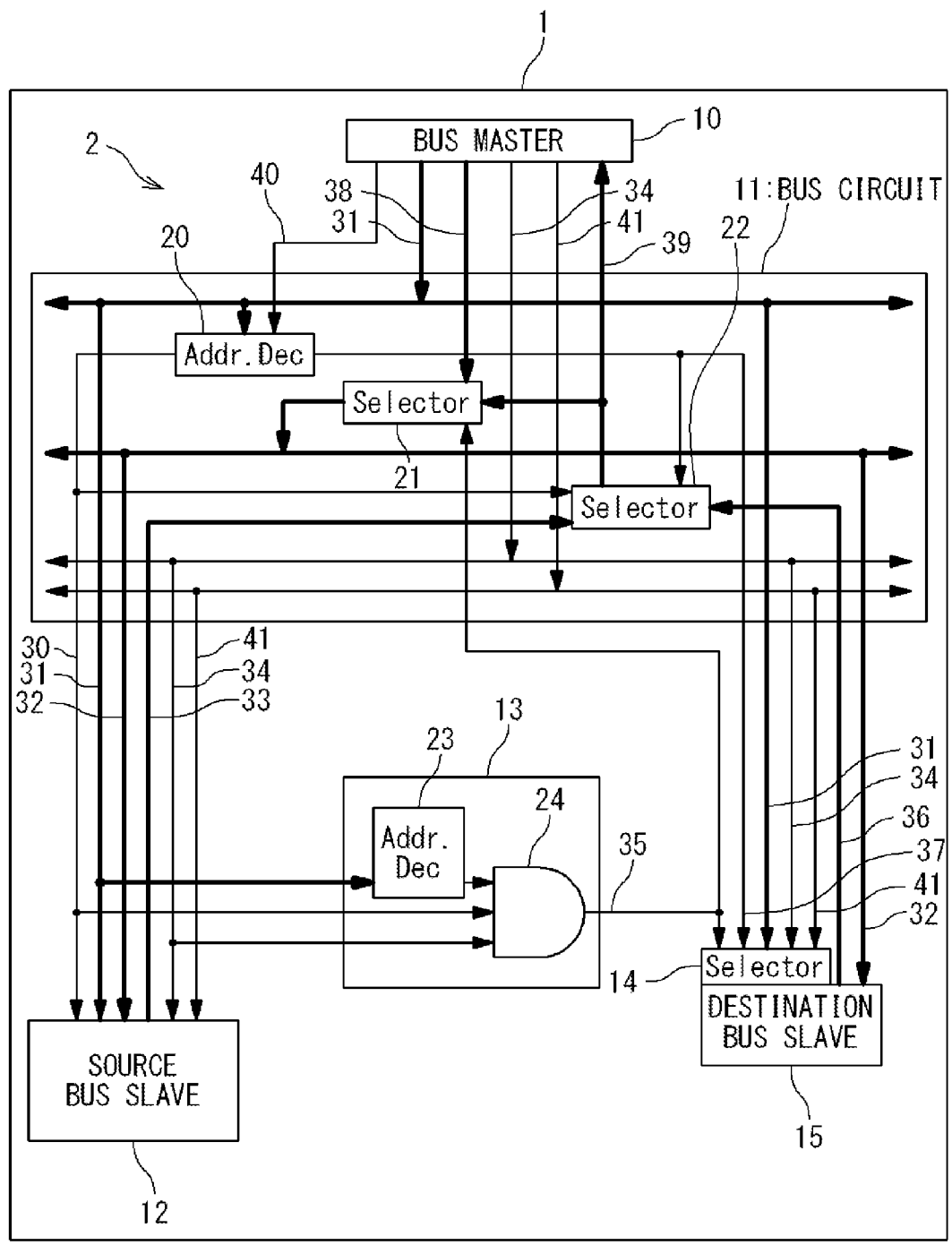
FIG. 5 is a block diagram showing a configuration of a semiconductor device provided with a bus connection circuit according to a first embodiment of the present invention.

FIG. 5 is a block diagram showing an example of the configuration of the semiconductor device provided with the bus connection circuit according to the first embodiment of the present invention. The semiconductor device 1 is exemplified by a semiconductor integrated circuit (LSI: Large Scale Integration) and is provided with a bus master 10, a plurality of bus slaves 12 and 15 and a bus connection circuit 2 which connects the bus master 10 and the plurality of bus slaves 12 and 15. In this example, the bus master 10 and a source bus slave 12 and a destination bus slave 15 of the plurality of bus slaves are connected to each other through the bus connection circuit 2. The bus connection circuit 2 is provided with a bus circuit 11, a direct transfer write strobe signal generating circuit 13 and a selector 14.

For example, the bus master 10 is a CPU (Central Processing Unit) or a memory controller (MEMC). An example which the bus master 10 is the CPU will be described below. Here, the present invention is not limited to the example in which the bus master 10 is the CPU 10. The CPU 10 issues read requests and write requests to the bus slaves. The CPU 10 outputs a slave selection signal 40, an address signal 31, CPU write data 38, a transfer enable signal 34 and a write strobe signal 41 to the bus circuit 11 and receives CPU read data 39.

The bus circuit 11 outputs select signal 30 and 37 to the bus slaves selected based on the address signal 31 when receiving the slave selection signal 40. For example, when the source bus slave 12 is selected based on the address signal 31, the bus circuit 11 outputs the source select signal 30. When the destination bus slave 15 is selected based on the address signal 31, the bus circuit 11 outputs the source select signal 37. When the source select signal 30 is outputted, the bus circuit 11 reads the source read data 33 from the source bus slave 12 and sets it as the CPU read data 39. When the direct transfer write strobe signal 35 to be described later is in a high level, the CPU read data 39 is set as the slave write data 32. When the direct transfer write strobe signal 35 is in a low level, the CPU write data 38 is set as the slave write data 32. The address signal 31, the transfer enable signal 34 and the write strobe signal 41 only pass through the bus circuit 11. The bus circuit 11 is provided with an address decoder 20, a write data selector 21 and a read data selector 22.

The address decoder 20 outputs the select signals 30 and 37 to the bus slaves 12 and 15 selected based on the address signal 31, when receiving the slave selection signal 40. The read data selector 22 reads the read data 33 and 36 from the bus slaves 12 and 15 and sets them as the CPU read data 39 (exemplified: connecting interconnection for the read data 33 and 36 with the interconnection for the CPU read data 39). When the direct transfer write strobe signal 35 is in the high level, the write data selector 21 sets the CPU read data 39 as the slave write data 32 (exemplified: connecting the interconnection for the CPU read data 39 with the interconnection for the slave write data 32). When the direct transfer write strobe signal 35 is in the low level, the CPU write data 38 is set as the slave write data 32 (exemplified: connecting the interconnection for the CPU write data 38 with the interconnection for the slave write data 32).

The source bus slave 12 is, for example, ROM (Read Only Memory), or RAM (Random Access Memory). The source bus slave 12 receives the source select signal 30, the address signal 31, the slave write data 32, the transfer enable signal 34 and the write strobe signal 41 from the bus circuit 11 and outputs the source read data 33 to the bus circuit 11.

The direct transfer write strobe signal generating circuit 13 receives the source select signal 30, the address signal 31 and the transfer enable signal 34, and outputs the direct transfer write strobe signal 35 in the high level when the address signal 31 is a preset address value. The direct transfer write strobe signal generating circuit 13 is provided with an address decoder 23 and a 3-input AND circuit 24.

In case that predetermined bits of the address signal 31 are the preset address value, the address decoder 23 outputs a resultant signal in the high level. The predetermined bits are bits showing a mirror area to be described later. The 3-input AND circuit 24 outputs the AND operation result of the resultant signal, the source select signal 30 and the transfer enable signal 34, as the direct transfer write strobe signal 35.

The selector 14 is connected with an immediately previous portion of the destination bus slave 15. When the direct transfer write strobe signal 35 is in the low level, a signal (of the destination select signal 37, the address signal 31, the transfer enable signal 34, the write strobe signal 41) of the bus circuit 11 is outputted to the destination bus slave 15. However, when the direct transfer write strobe signal 35 is in the high level, the destination select signal 37, the transfer enable signal 34 and the write strobe signal 41 are made active, and the address signal 31 is set to a value preset in the selector 14 and outputted to the destination bus slave 15.

The value of the address signal preset in the selector 14 is a value showing a register in the destination bus slave 15. As the setting method, there are a method of embedding it in the selector 14 as a hardware configuration and a method of providing a bus interface as a register set from the CPU 10. In the present embodiment, the method of embedding in the selector 14 as the hardware configuration will be described.

The destination bus slave 15 is, for example, ROM (Read Only Memory) or RAM (Random Access Memory). The destination bus slave 15 receives the slave write data 32 from the bus circuit 11, receives the destination select signal 37, the address signal 31, the transfer enable signal 34 and the write strobe signal 41 through the selector 14, and outputs the source read data 36 to the bus circuit 11.

Figure 6:
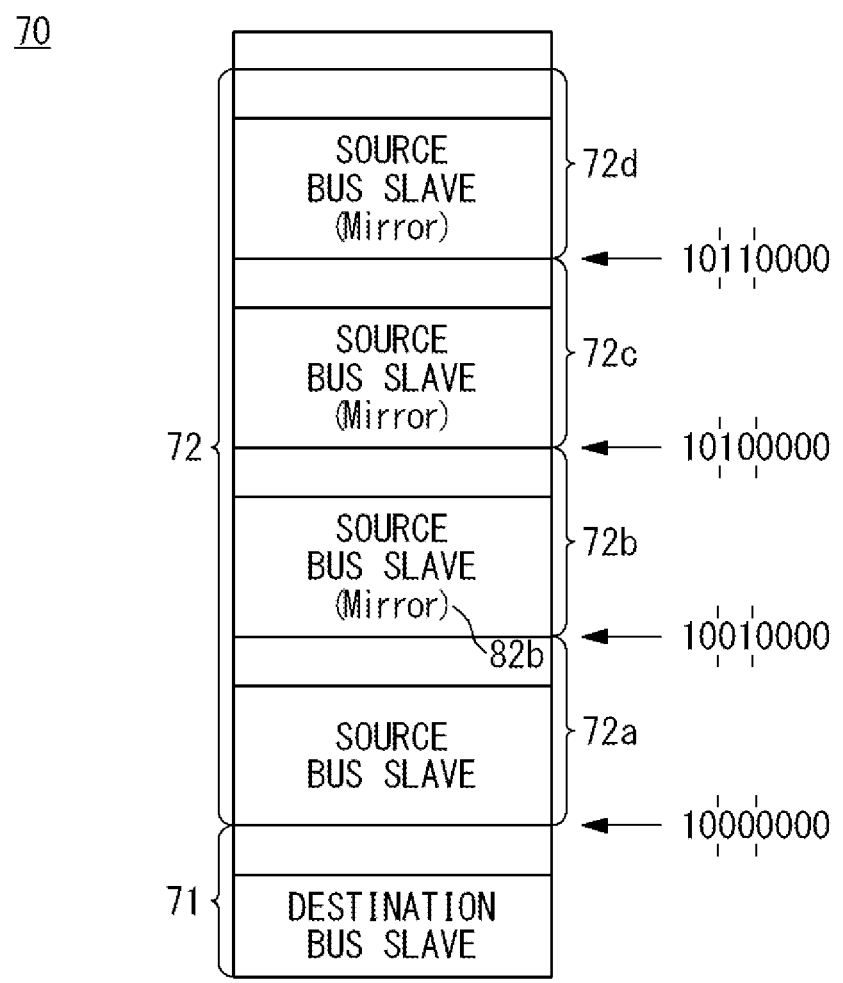
FIG. 6 is a diagram showing an example of a memory map of the semiconductor device according to the first embodiment of the present invention.

FIG. 6 is a diagram showing an example of a memory map 70 of the semiconductor device according to the first embodiment of the present invention.

The following description will be given under the following conditions. The conditions are as follows: The address signal 31 is of 8 bits. The number of registers disposed in the source bus slave 12 is equal to or less than 16. The source bus slave 12 uses only bits [3:0] (lower 4 bits) of the address signal 31 for the selection of the register. The address decoder 20 in the bus circuit 11 sets the source bus slave selection signal 30 active when the bits [7:6] (higher 2 bits) of the address signal 31 outputted from the CPU 10 are "10". The description will be given under this condition.

When the bits [7:6] are "10", the first register (the offset address: +0000) of the source bus slave 12 is accessible even if either of four addresses of "10000000", "10010000", "10100000", "10110000" is used. This is because the register can be selected by using only the bits [3:0] (lower 4 bits). Of these addresses, three of "10010000", "10100000", and "10110000" are referred to as mirror areas. Therefore, areas shown by these four addresses (containing three mirror areas) show an identical area (an identical register).

As described above, of the address signal 31, the bits [7:6] are used for the selection of the source bus slave 12, and the bits [3:0] are used for the selection of the register in the source bus slave 12. However, the bits [5:4] of the address signal 31 only show the mirror areas and are not used for anything substantively. For this reason, it is supposed that in the present embodiment, when a direct transfer is carried out from the source bus slave 12 to the destination bus slave 15 (in case of 1-cycle transfer), the CPU 10 sets either of "01", "10", and "11" to the bits [5:4] of the address signal 31. On the other hand, it is supposed that when the direct transfer is not carried out (for example, in case of 2-cycle transfer), the CPU 10 sets "00" to the bits [5:4] of the address signal 31. That is, whether or not the direct transfer must be carried out is specified based on whether or not the address signal specifies any of the mirror areas (bits [5:4]="01", "10", and "11").

In this way, in the present embodiment, not only specification of data (specification of the mirror area by the address signal) but also execution of an instruction (operation) are attained by accessing the mirror area which has not been substantively used at all. Thus, the mirror area is effectively used. Here, as the instruction (operation), the direct transfer (1-cycle transfer) is set. As a result, it is possible to deal with a case of direct transfer (1-cycle transfer), and a case of non direct transfer (for example, 2-cycle transfer), by changing the bits [5:4] of the address signal 31. As a result, a procedure for switching between the 1-cycle transfer and the 2-cycle transfer becomes unnecessary, although the setting of the procedure is necessary in Patent Literature 1.

In this example, the memory map 70 contains a memory area 71 of the destination bus slave 15 and memory areas 72 of the source bus slave 12. Here, in the memory areas 72 of the source bus slave 12, four memory areas 72a to 72d exist. However, actually, only one memory area 72 exists and the remaining three areas show mirror areas. In this case, as described above, the direct transfer is not carried out (for example, 2-cycle transfer is carried out) when the bits [5:4] is "00", and the direct transfer is carried out (1-cycle transfer is carried out), when the bits [5:4] is either of "01", "10", and "11". Therefore, because the bits [5:4] are "00" when the address signal is "10000000", the memory area 72a is specified and the direct transfer is not carried out (for example, 2-cycle transfer is carried out). Also, because the bits [5:4] are "01" when the address signal is "10010000", the memory area 72b is specified and the direct transfer is carried out (1-cycle transfer is carried out).

At this time, it is supposed that the direct transfer is set (the memory area 72b is accessed) when the value of bits [5:4] is "01". In this case, the address decoder 23 outputs a signal in the high level if the value of bits [5:4] is "01" when the address signal 31 is decoded. As a result, the direct transfer write strobe signal generating circuit 13 sets the direct transfer write strobe signal 35 active. On the other hand, the address decoder 23 outputs the signal in the low level if the value of bits [5:4] is "00" (the memory area 72a is accessed). As a result, the direct transfer write strobe signal generating circuit 13 sets the direct transfer write strobe signal 35 to the low level. It should be noted that when the value of the bits [5:4] is "10" or "11" (accessing the memory area 72c or 72d), the direct transfer may be carried out or may not be carried out. Or, another different instruction may be executed.

The value shown by such an address signal 31 is embedded in the program code of the CPU 10. Therefore, change of the value shown by the address signal 31 into the mirror area imposes no overhead (change of the value of the bits [5:4] from [00] to either of "01", "10", and "11").

It should be noted that the memory map 70 shown in FIG. 6 is only an example and the present embodiment is never limited to this example. That is, if at least one of the mirror areas shown by the address signal 31 corresponds to the direct transfer (1-cycle transfer), the configuration of the memory map can be optionally set.

As described above, it is possible to set in such a manner that the instruction for read access to the mirror area additionally contains another different instruction (operation). For example, in the above embodiment, it is possible to incorporate the "direct transfer" in the read access. That is, it is possible to execute another additional instruction (operation) in addition to the simple read access by changing the address signal (specification of the mirror area) without carrying out an additional setting at all.

Also, because the read instruction is transferred from the CPU 10 to the source bus slave 12 after the read instruction is detected, the CPU 10 can control an address (read address) accessed by the source bus slave 12.

Figure 7:
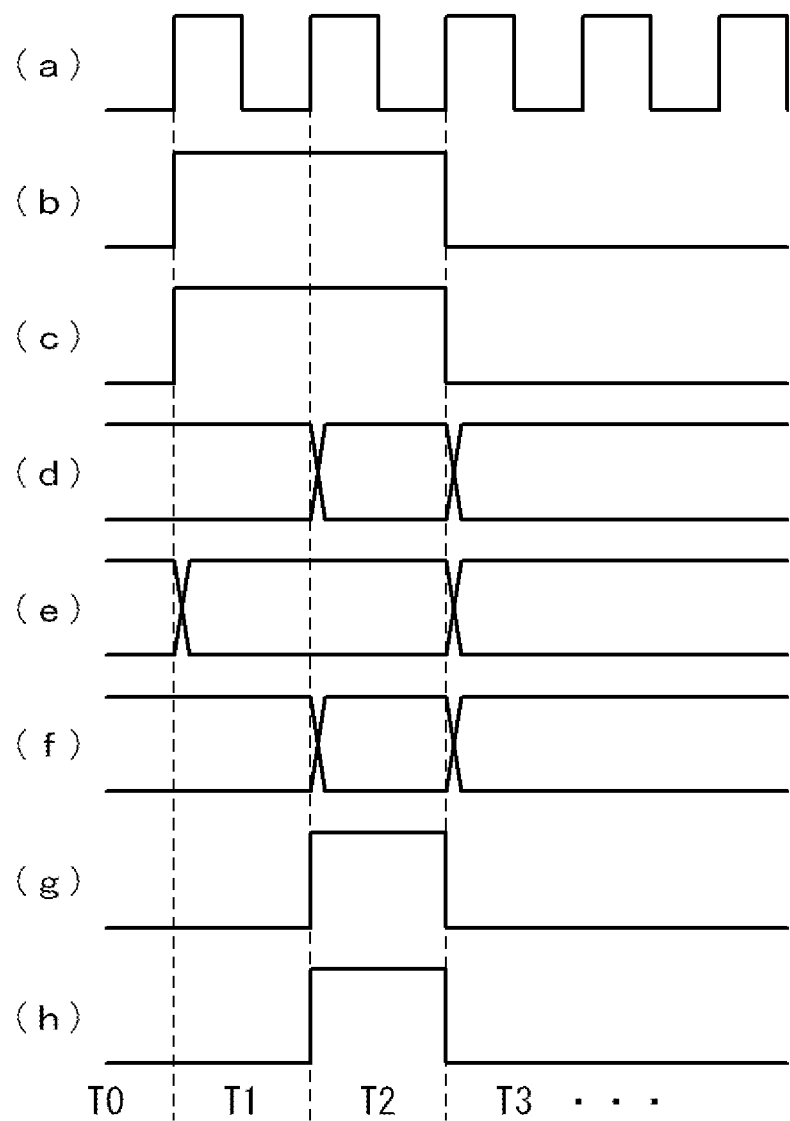
FIG. 7 is a diagram of timing charts showing a method of controlling the bus connection circuit according to the first embodiment of the present invention.

Next, a method of controlling the bus connection circuit (operation of the bus connection circuit (semiconductor device)) according to the first embodiment of the present invention will be described. FIG. 7 is a diagram showing timing charts of the method of controlling the bus connection circuit according to the first embodiment of the present invention. In FIG. 7, (a) shows a clock signal, (b) shows a slave selection signal 40, (c) shows a source select signal 30, (d) shows source read data 33, (e) shows an address signal 31, (f) shows CPU read data 39, (g) shows a transfer enable signal 34, and (h) shows a direct transfer write strobe signal 35. In this example, a case is considered that the direct transfer (1-cycle transfer) is carried out by the CPU 10 read-accessing the mirror area of the source bus slave 12.

At timing of T1, the CPU 10 read-accesses the mirror area of the source bus slave 12 (a read request is issued onto the bus circuit 11). That is, the CPU 10 sets (b) the slave selection signal 40 to the high level and outputs (e) the address signal 31. The address decoder 20 sets (c) the source select signal 30 to the high level based on the slave selection signal 40 and the address signal 31, and issues a read access request to the source bus slave 12 selected based on the address signal 31.

At the timing of T2, the source bus slave 12 outputs (d) the source read data 33 from the area specified by the address signal 31. The selector 22 sets the source read data 33 as the CPU read data 39 based on the source select signal 30 (for example, connecting the interconnection for the source read data with the interconnection for the CPU read data). The source read data 33 becomes a read response.

Also, at the timing of T2, the CPU 10 sets (g) the transfer enable signal 34 to the high level. The direct transfer write strobe signal generating circuit 13 generates (h) the direct transfer write strobe signal 35 based on the address signal 31, the source select signal 30 and the transfer enable signal 34. At this time, the direct transfer write strobe signal 35 becomes the high level, when the source select signal 30 is in the high level, the transfer enable signal 34 is in the high level, and the decoding result of the bits [5:4] of the address signal 31 showing the mirror area by the address decoder 23 becomes high level.

Also, at the timing of T2, because the direct transfer write strobe signal 35 is in the high level, a write data selector 21 sets the CPU read data 39 to the slave write data 32 (for example, connecting the interconnection for the CPU read data with the interconnection for the slave write data).

Also, at the timing of T2, because the direct transfer write strobe signal 35 is in the high level, the selector 14 activates the destination select signal 37, the transfer enable signal 34, and the write strobe signal 41, of the destination select signal 37, the address signal 31, the transfer enable signal 34 and the write strobe signal 41 from the bus circuit 11. Also, the selector 14 sets the address signal 31 to the value preset in the selector 14 and outputs to the destination bus slave 15. As a result, the destination bus slave 15 can write the slave write data 32 based on the destination select signal 37, the transfer enable signal 34, the write strobe signal 41 and the preset address signal 31.

According to the present embodiment, the reduction of bus transfer efficiency can be prevented in case where the 1-cycle transfer and the non 1-cycle transfer are mixed. The reason is in that the ordinary access to the source bus slave and the 1-cycle transfer can be distinguished based on the direct transfer write strobe signal 35 generated from the address signal 31 showing the mirror area so that the 1-cycle transfer is made possible without any setting of the memory controller (MEMC). At this time, the value shown by the address signal 31 is embedded in the program code of the CPU 10, and there is no overhead when this value is changed to the mirror area.

Figure 8:
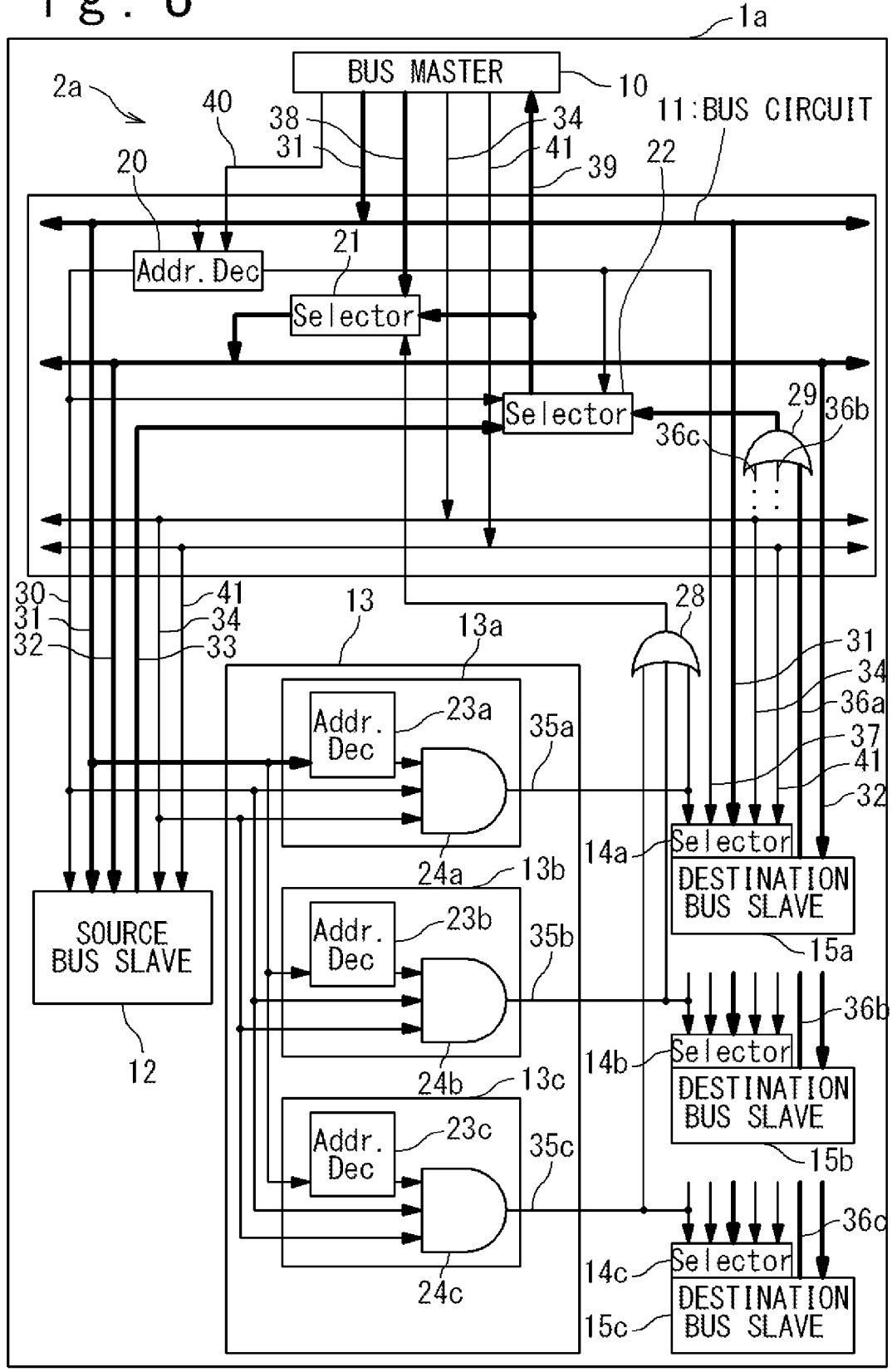
FIG. 8 is a block diagram showing a modification example of the configuration of the semiconductor device provided with the bus connection circuit according to the first embodiment of the present invention.

FIG. 8 is a block diagram showing a modification example of the configuration of the semiconductor device provided with the bus connection circuit according to the first embodiment of the present invention. The modification example is different from the semiconductor device 1 and the bus connection circuit 2 in FIG. 5 in that the semiconductor device 1a is provided with a plurality of destination bus slaves 15a, 15b and 15c, and the bus connection circuit 2a is provided with a plurality of direct transfer write strobe signal generating circuits 13a, 13b and 13c. The plurality of direct transfer write strobe signal generating circuits 13a, 13b and 13c correspond to the plurality of destination bus slaves 15a, 15b and 15c, respectively.

In an example of FIG. 5, because the destination bus slave 15 as an object of the direct transfer is one, the direct transfer is carried out when the bits [5:4] is either of "01", "10", and "11". On the other hand, in an example of this diagram, the plurality of destination bus slaves 15a, 15b and 15c are provided as the object of the direct transfer. In this case, each destination can be specified based on the bits [5:4]. For example, it is supposed that the direct transfer to the first destination bus slave 15a is carried out when the bits [5:4] is "01", the direct transfer to the second destination bus slave 15b is carried out when the bits [5:4] is "10", and the direct transfer to the third destination bus slave 15c is carried out when the bits [5:4] is "11".

The direct transfer write strobe signal generating circuits 13a, 13b and 13c output the direct transfer write strobe signals 35a, 35b, and 36c based on the address signal 31, the source select signal 30 and the transfer enable signal 34. For example, in the direct transfer write strobe signal generating circuit 13a, when the source select signal 30 is in the high level, the transfer enable signal 34 is in the high level, the bits [5:4] of the address signal 31 showing the mirror area is "01", and the output of the address decoder 23a becomes high level, the direct transfer write strobe signal 35a becomes high level. Also, in the direct transfer write strobe signal generating circuit 13b, when the source select signal 30 is in the high level, the transfer enable signal 34 is in the high level, the bits [5:4] of the address signal 31 showing the mirror area is "10", and the output of the address decoder 23b becomes high level, the direct transfer write strobe signal 35b becomes high level. Also, in the direct transfer write strobe signal generating circuit 13c, when the source select signal 30 is in the high level, the transfer enable signal 34 is in the high level, the bits [5:4] of the address signal 31 showing the mirror area is "11", and the output of the address decoder 23c becomes high level, the direct transfer write strobe signal 35c becomes high level. The direct transfer write strobe signals 35a, 35b, and 35c are supplied to the 3-input OR circuit 28 and the output of the circuit 28 is supplied to the write data selector 21.

Also, the read data 36a, 36b, and 36c from the destination bus slaves 15a, 15b, and 15c are bundled by a 3-input OR circuit 29 and the output of the circuit 29 is supplied to the selector 22. The other operation is same as a case of FIG. 5.

As in this modification example, it becomes possible to simultaneously execute an instruction (operation) to specify the destination of the direct transfer and an instruction (operation) of whether or not the direct transfer should be carried out, by using the bits (for example, the bits [5:4]) showing the mirror area of the address signal 31.

As described above, it is possible to additionally incorporate another instruction (operation) in the instruction of read access to the mirror area. For example, in the above modification example, "the destination selection" and "the direct transfer" can be incorporated into the read access. That is, the other additional instruction (operation) can be executed in addition to mere read access, by changing the address signal (specification of the mirror area) without an additional setting at all.

Second Embodiment

Next, the semiconductor device provided with the bus connection circuit according to a second embodiment by the present invention will be described.

Figure 9:
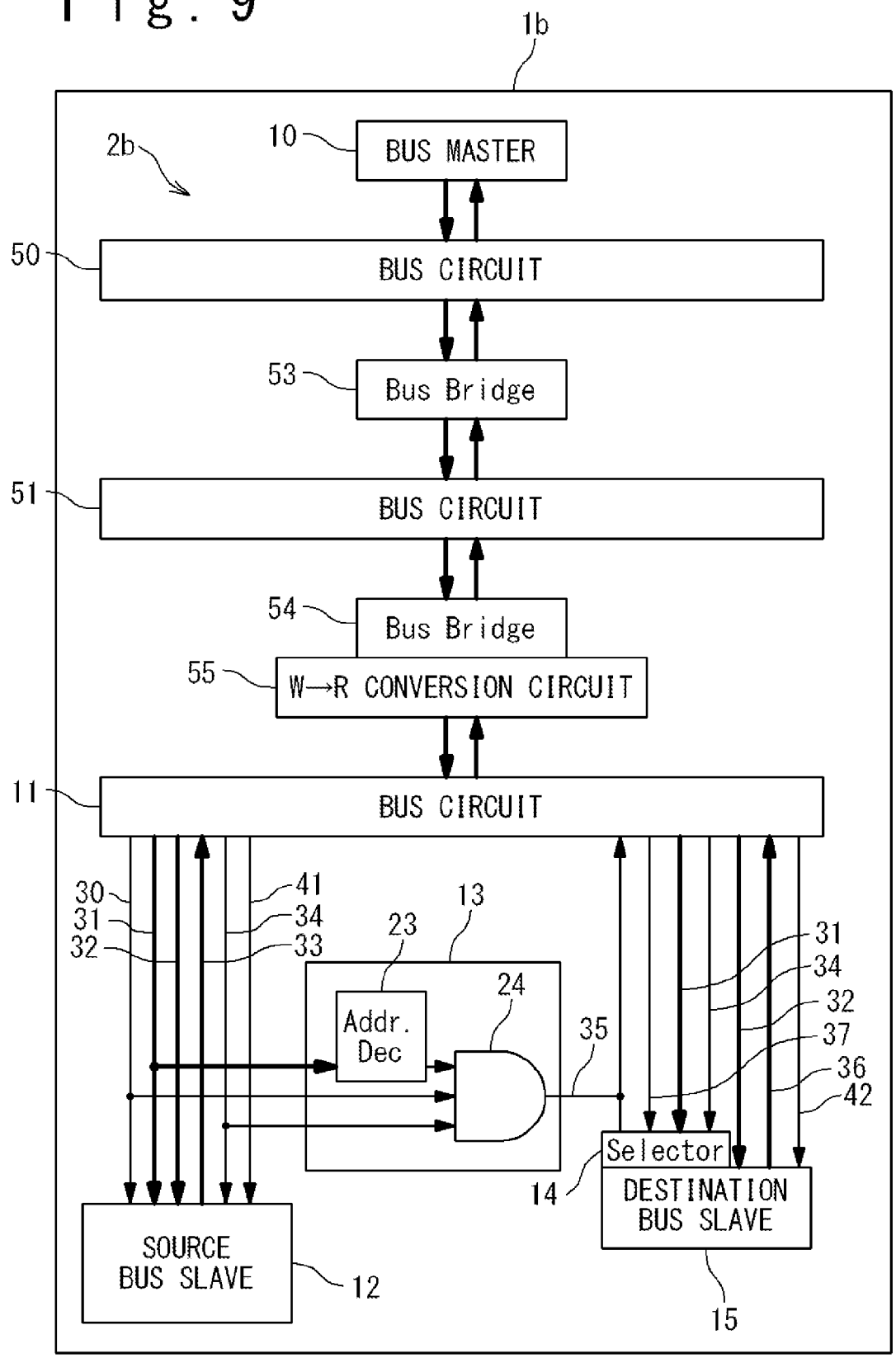
FIG. 9 is a block diagram showing the configuration of the semiconductor device provided with the bus connection circuit according to a second embodiment of the present invention.

FIG. 9 is a block diagram showing an example of the configuration of the semiconductor device provided with the bus connection circuit according to the second embodiment of the present invention. The semiconductor device 1b and the bus connection circuit 2b in the present embodiment differ from the semiconductor device 1 and the bus connection circuit 2 in the first embodiment in the point of bus circuits 50 and 51, bus bridge circuits 53 and 54 and a write-read conversion circuit 55 are further provided. Below, a difference is mainly described.

The CPU 10 is connected with the bus circuit 50. A bus bridge 53 delivers data of the bus circuit 50 and the bus circuit 51. The bus bridge 54 delivers the data of the bus circuit 51 and the bus circuit 11. The bus bridge 53 and the bus bridge 54 are general bus bridge circuits. Also, the transfer of data between the bus bridge 54 and the bus circuit 11 is carried out through the write-read conversion circuit 55. The write-read conversion circuit 55 converts a write access signal from the CPU 10 into a read access signal in the delivery of the data.

Figure 10:
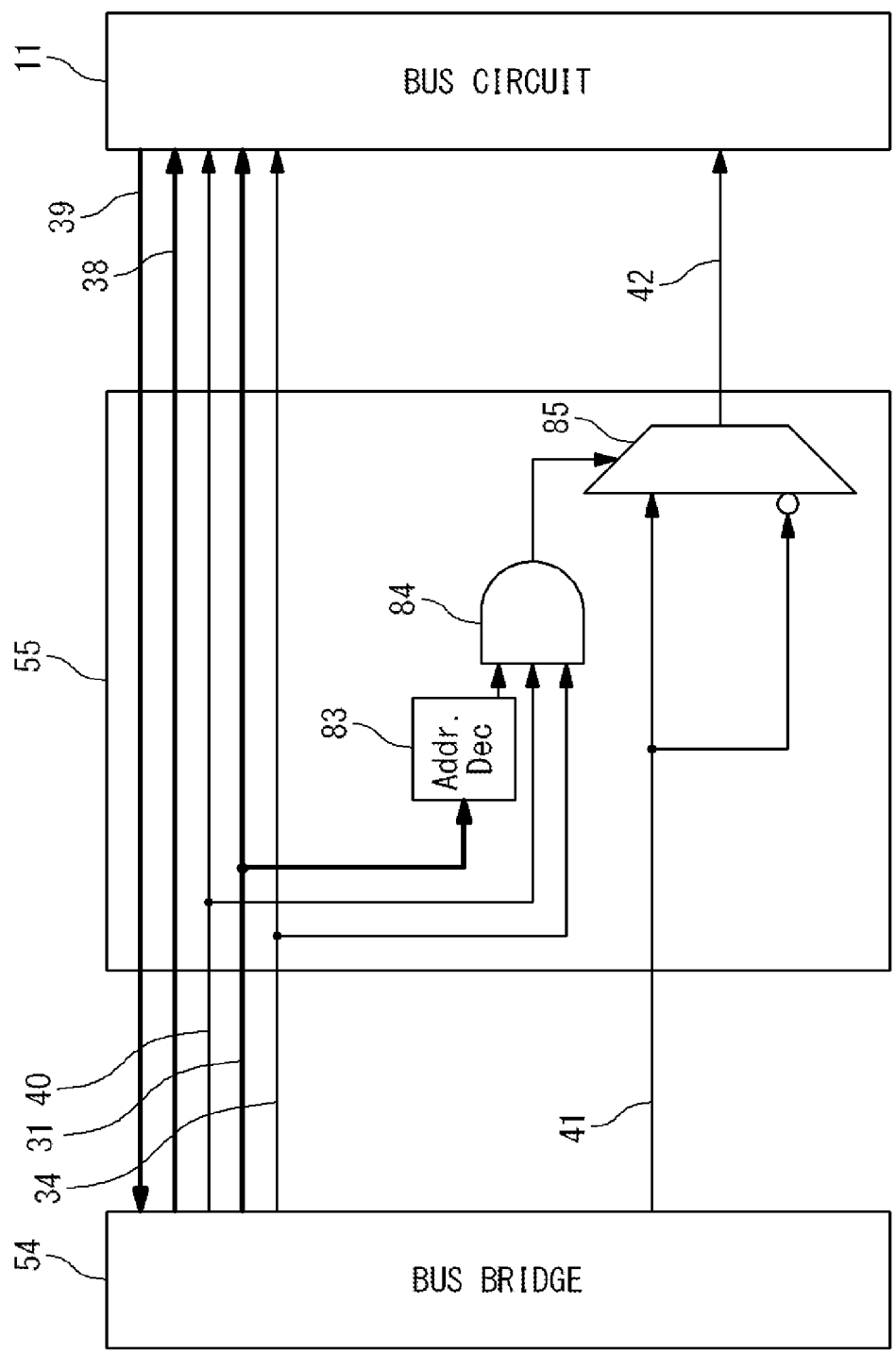
FIG. 10 is a block diagram showing an example of the configuration of the write-read conversion circuit of the bus connection circuit according to the second embodiment of the present invention.

FIG. 10 is a block diagram showing an example of the configuration of the write-read conversion circuit of the bus connection circuit according to the second embodiment of the present invention. The write-read conversion circuit 55 detects whether or not the access by the CPU 10 is destined to a mirror area (direct transfer), based on a bus slave selection signal 40, the address signal 31 and the transfer enable signal 34 received from the bus bridge 54. In case of the access to the mirror area (direct transfer), the write strobe signal 41 received from the bus bridge 54 is inverted and outputted to the bus circuit 11 as the write strobe signal 42. Moreover, the address signal 31, the transfer enable signal 34, and the bus slave selection signal 40 received from the bus bridge 54 are outputted to the bus circuit 11. The CPU read data 39 and the CPU write data 38 only pass through the write-read conversion circuit 55. The write-read conversion circuit 55 is provided with an address decoder 83, a 3-input AND circuit 84 and a multiplexer 85.

When the predetermined bits of the address signal 31 received from the bus bridge 54 are a preset address value (in case of the direct transfer), the address decoder 83 outputs a resultant signal of the high level. The predetermined bits are the bits showing the mirror area described in the first embodiment. In an example of FIG. 6, the predetermined bits are the bits [5:4]. That is, in case of the access to the mirror area (in case of the direct transfer), the resultant signal of the high level is outputted. The 3-input AND circuit 84 outputs an AND operation result of the resultant signal, and the transfer enable signal 34 and the bus slave selection signal 40 received from the bus bridge 54, to the multiplexer 85 as the control signal. That is, in case of the access to the mirror area, the control signal of the high level is outputted. In case of the access to the mirror area, the multiplexer 85 outputs the strobe signal 42 obtained by inverting the write strobe signal 41, to the bus circuit 11 based on the control signal. This strobe signal 42 is a read strobe signal because the signal 42 is generated by inverting the write strobe signal 41. On the other hand, in case of non access to the mirror area, the control signal of the low level is outputted. In case of non access to the mirror area, the multiplexer 85 outputs to the bus circuit 11, the write strobe signal 41 just as it is as the strobe signal 42 based on the control signal without inverting the write strobe signal 41. This strobe signal 42 is the write strobe signal because it is the write strobe signal 41 just as it is.

Next, a method of controlling the bus connection circuit according to the second embodiment of the present invention (operation of the bus connection circuit (semiconductor device)) will be described.

In case of the read request to the source bus slave 12, when the CPU 10 issue a read request, the read request is propagated to the bus bridge 53, the bus bridge 54, and the source bus slave 12. When the source bus slave 12 issues read data in response to the read request, the read data is propagated to the bus bridge 54, the bus bridge 53, and the CPU 10. Thus, the read request completes. The bus bridge 53 issues a data transfer completion notice (read response) to the CPU 10 based on the read data transfer completion corresponding to the read request. Thus, the processing of the read request completes.

On the other hand, in case of the write request to the source bus slave 12, when the CPU 10 issues a write request, the write request is propagated to the bus bridge 53, the bus bridge 54, and the source bus slave 12. However, the bus bridge 53 can issue a data transfer completion notice (a write response) to the CPU 10 at the timing of a clock next to issuance of the write request. The bus bridge 53 does not have to wait for the write data transfer completion.

From the above, in the present embodiment, the direct transfer is not carried out in response to the read request, but is carried out in response to the write request, unlike the first embodiment. In this way, even if the request of the direct transfer is propagated through the plurality of bus bridges, the CPU 10 can receive the data transfer completion notice in a short time. Here, in order to use the configuration of the bus connection circuit in the first embodiment using the read request, the write request is converted into the read request by the write-read conversion circuit 55. Hereinafter, it will be described in detail.

Figure 11:
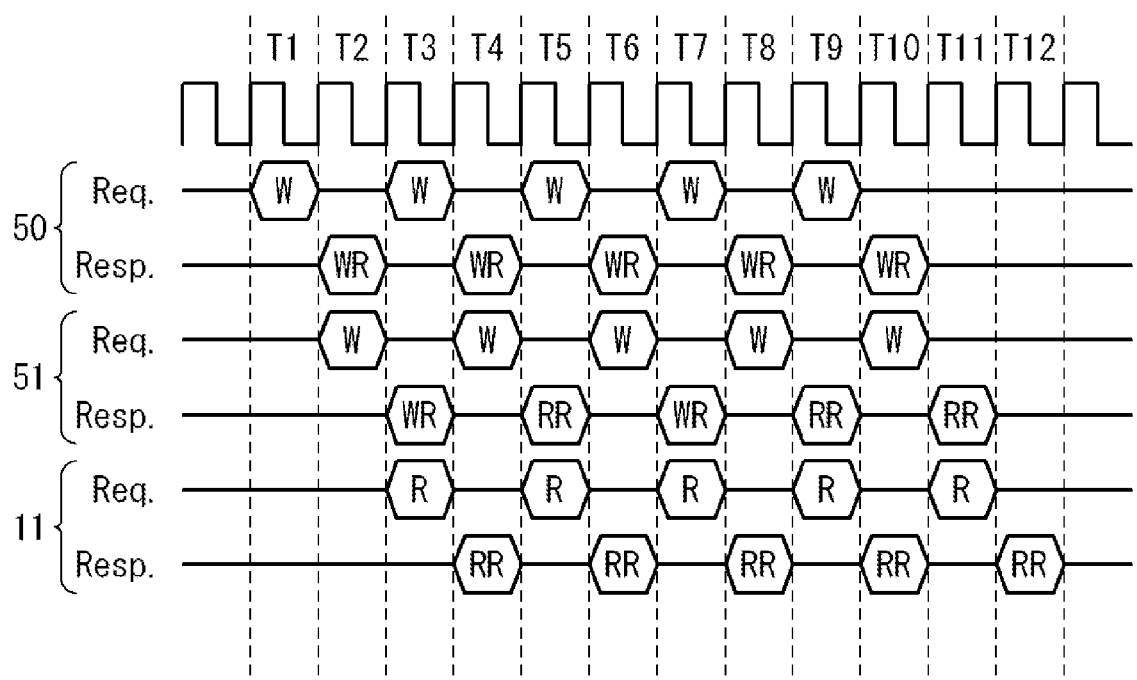
FIG. 11 is a diagram of timing charts showing a method of controlling the bus connection circuit according to the second embodiment of the present invention.

FIG. 11 is a diagram of timing charts showing a method of controlling the bus connection circuit according to the second embodiment of the present invention. Here, a case is considered where the direct transfer (1-cycle transfer) is carried out by the CPU 10 write-accessing to the mirror area of the source bus slave 12.

At the timing of T1, the CPU 10 issues a write request (W) to the bus circuit 50. The write request (W) is a write request to the mirror area of the source bus slave 12. The bus bridge 53 receives the write request (W) from the bus circuit 50.

At the timing of T2, the bus bridge 53 returns a write response (WR) on the bus circuit 50 in response to the write request (W) and completes a bus transfer. Because the bus transfer has completed, the CPU 10 can issue the next write request (W) at the timing of T3.

At the timing of T2, the bus bridge 53 issues a write request (W) to the bus circuit 51 in response to the write request (W). The bus bridge 54 receives the write request (W) from the bus circuit 51.

At the timing of T3, the bus bridge 54 returns the write response (WR) to the bus circuit 51 in response to the write request (W) and completes a bus transfer. Because the bus transfer has completed, the bus bridge 53 can issue the next write request (W) at the timing of T4.

At the timing of T3, the bus bridge 54 issues a write request (W) to the source bus slave 12 in response to the write request (W). In response to this, the write-read conversion circuit 55 converts the write request (W) into a read request (R) and issues it to the bus circuit 11. The bus circuit 11 receives the read request (R) from the write-read conversion circuit 55. In addition, the bus circuit 11 receives the bus slave selection signal 40, the address signal 31 and the transfer enable signal 34 from the bus bridge 54 (CPU 10). After that, an operation similar to the first embodiment is performed and the direct transfer is carried out. In this case, the timing T3 of this diagram corresponds to the timing T1 in the first embodiment. Also, the timing T4 of this diagram corresponds to the timing T2 in the first embodiment. Also, as a result, at the timing T4, the source bus slave 12 outputs the read data to the bus circuit 11, and a read response (RR; CPU read data 39) is replied to the bus circuit 11 and the bus transfer completes.

Figure 12:
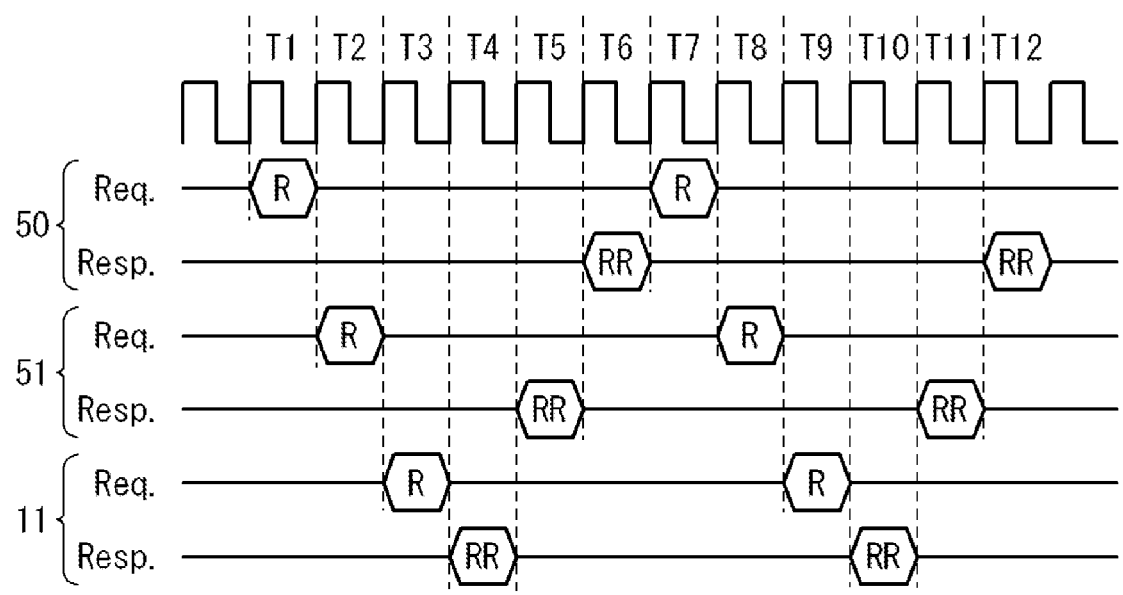
FIG. 12 is a diagram of timing charts showing the method of controlling when the write-read conversion circuit is not used in the bus connection circuit according to the second embodiment of the present invention.

FIG. 12 is a diagram showing timing charts of a control method when the write-read conversion circuit is not used (turned off) in the bus connection circuit according to the second embodiment of the present invention. When the write-read conversion circuit 55 is turned off and not used, the conversion from the write request into the read request by the write-read conversion circuit 55 is not carried out. Therefore, the CPU 10 must issue a read request (R) to the source bus slave 12. The operation in this case is as follows.

At the timing of T1, the CPU 10 issues a read request (R) to the bus circuit 50. The read request (R) is a write request to the mirror area of the source bus slave 12. The bus bridge 53 receives the read request (R) from the bus circuit 50.

At the timing of T2, the bus bridge 53 issues a read request (R) to the bus circuit 51 in response to the read request (R). The bus bridge 54 receives the read request (R) from the bus circuit 51.

At the timing of T3, the bus bridge 54 issues a read request (R) to the bus circuit 11 in response to the read request (R). In addition, the bus circuit 11 receives the bus slave selection signal 40, the address signal 31 and the transfer enable signal 34 from the bus bridge 54 (CPU 10).

After that, the operation similar to the first embodiment is executed and the direct transfer is carried out. In this case, the timing T3 in this diagram corresponds to the timing T1 in the first embodiment. Also, the timing T4 in this diagram corresponds to the timing T2 in the first embodiment. Also, as a result, at the timing T4, the source bus slave 12 outputs read data onto the bus circuit 11, to return a read response (RR; CPU read data 39) onto the bus circuit 11.

At the timing of T5, the bus bridge 54 issues a read response (RR) to the bus circuit 51 in response to the read response (RR). The bus bridge 53 receives the read response (RR) from the bus circuit 51.

At the timing of T6, the bus bridge 53 issues a read request (R) to the bus circuit 50 in response to read response (RR). The CPU 10 receives the read response (RR) from the bus circuit 50. Through the above process, the bus transfer completes.

As mentioned above, when the write-read conversion circuit 55 is turned off (FIG. 12), in the read request generated from the CPU 10 to the source bus slave 12 at the timing of T1, the read data transfer can not be completed until the read response returns from the bus bridge 53 to the CPU 10 at the timing of T6. That is, when the write-read conversion circuit 55 is turned off, the CPU 10 needs 6 clocks from T1 to T6 to complete the direct transfer for once. However, when the write-read conversion circuit 55 is turned on (FIG. 11), the CPU 10 only requires 2 clocks from T1 to T2 to complete the direct transfer for once. In this way, the CPU 10 can obtain a data transfer completion notice in a short time by using the write-read conversion circuit 55.

In the bus connection circuit of the present embodiment, the same effect as in the first embodiment can be obtained. The reason is in that the direct transfer from the source bus slave 12 to the destination bus slave 15 can be carried out by the same configuration and method as in the first embodiment because a write request is converted into the read request by the write-read conversion circuit 55.

Moreover, in the bus connection circuit of the present embodiment, it is possible to improve the throughput of the 1-cycle transfer in the multi-stage bus circuit through the bus bridge. The reason is in that the bus bridge can return the write response to the bus master without waiting for the response from the source bus slave 12 and the bus master can start to issue the next write request.

As described above, another additional instruction (operation) can be incorporated into the instruction for the write access to the mirror area. For example, in the above embodiment, "the conversion of a write access into of a read access" or "the direct transfer" can be incorporated in the write access. That is, not only a mere write access but also another additional instruction (operation) are made possible by changing the address signal (specification of the mirror area) without any additional setting at all.

Third Embodiment

Next, the semiconductor device provided with the bus connection circuit according to a third embodiment of the present invention will be described.

Figure 13:
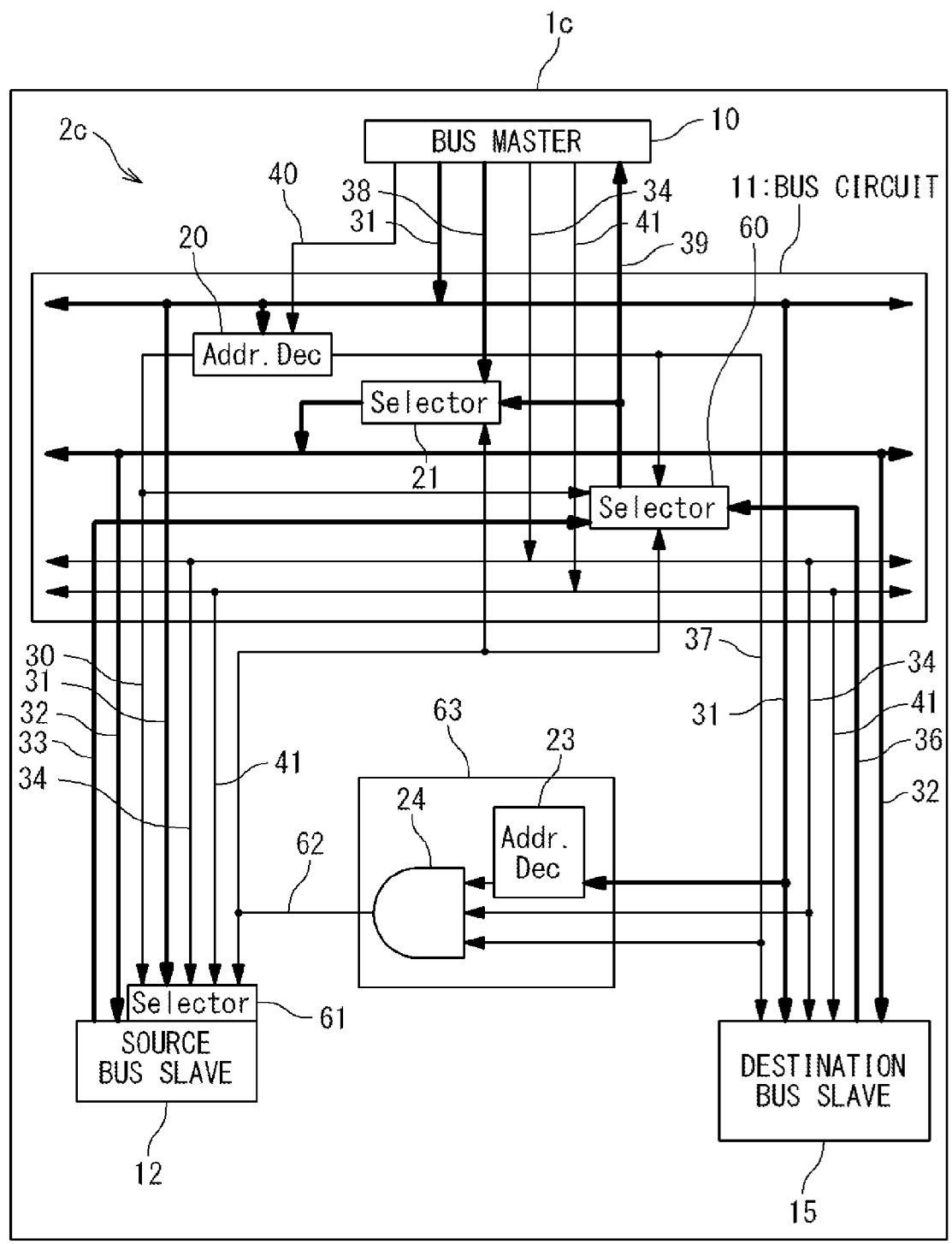
FIG. 13 is a block diagram showing the configuration of the semiconductor device provided with the bus connection circuit according to a third embodiment of the present invention.

FIG. 13 is a block diagram showing an example of the configuration of the semiconductor device provided with the bus connection circuit according to the third embodiment of the present invention. The semiconductor device 1c and the bus connection circuit 2c in the present embodiment are different from them of the first embodiment in that the direct transfer is attained through not a read access to the mirror area of the destination bus slave 15 but a write access to the mirror area of the source bus slave 12. A main difference will be described below.

In the bus connection circuit 2c, the read data selector 22 is replaced with a selector 60, the selector 14 is replaced with a selector 61 and the direct transfer write strobe signal generating circuit 13 is replaced with a direct transfer read strobe signal generating circuit 63, compared with the bus connection circuit 2 in the first embodiment.

The address decoder 20 outputs the select signals 30 and 37 to the bus slaves 12 and 15 selected based on the address signal 31 when the slave selection signal 40 is supplied.

When the direct transfer read strobe signal 62 to be described later is in the low level and the destination select signal 37 is in the high level, the selector 60 outputs the destination read data 36 as the CPU read data 39 (for example, connects the interconnection for read data 36 with the interconnection for the CPU read data 39). Also, when the direct transfer read strobe signal 62 is in the low level and the source select signal 30 is in the high level, the selector 60 outputs the source read data 33 as the CPU read data 39 (for example, connects the interconnection for read data 33 with the interconnection for the CPU read data 39). On the other hand, when the direct transfer read strobe signal 62 is in the high level and the destination select signal 37 is in the high level, the selector 60 outputs the source read data 33 as the CPU read data 39 (for example, connects the interconnection for read data 33 with the interconnection for the CPU read data 39). Also, when the direct transfer read strobe signal 62 is in the high level and the source select signal 30 is in the high level, the selector 60 outputs the destination read data 36 as the CPU read data 39 (for example, connects the interconnection for the read data 36 with the interconnection for the CPU read data 39).

When the direct transfer read strobe signal 62 to be described later is in the high level, the write data selector 21 sets the CPU read data 39 as the slave write data 32 (for example, connects the interconnection for the CPU read data 39 with the interconnection for slave write data 32). When the direct transfer write strobe signal 35 is in the low-level, the write data selector 21 sets the CPU write data 38 as the slave write data 32 (for example, connects the interconnection for the CPU write data 38 with the interconnection for the slave write data 32).

A direct transfer read strobe signal generating circuit 63 receives the destination select signal 37, the address signal 31 and the transfer enable signal 34 and outputs a direct transfer read strobe signal 62 of the high level when the predetermined bits of the address signal 31 specifies the preset address value. The direct transfer read strobe signal generating circuit 63 is provided with an address decoder 23 and a 3-input AND circuit 24.

When the predetermined bits of the address signal 31 are equal to the preset address value, the address decoder 23 outputs a resultant signal of the high level. The predetermined bits are the bits showing the mirror area (FIG. 6) described in the first embodiment. The 3-input AND circuit 24 outputs the AND operation result of the result signal, the source select signal 30 and the transfer enable signal 34 as the direct transfer read strobe signal 62.

The selector 61 is connected with an immediately front portion to the source bus slave 12. When the direct transfer read strobe signal 62 is in the low level, the selector 61 outputs the signal of the bus circuit 11 (the source select signal 30, the address signal 31, the transfer enable signal 34, and the write strobe signal 41) to the source bus slave 12. However, when the direct transfer read strobe signal 62 is in the high level, the selector 61 sets the source select signal 30 and the transfer enable signal 34 active, and sets the address signal 31 to a value preset in the selector 61 to output to the source bus slave 12.

In the present embodiment, the CPU 10 carries out the write accesses to the mirror area of the destination bus slave 15. As the method of setting the mirror area, the method of FIG. 6 is exemplified. However, in the present embodiment, the area of the destination bus slave and the area of the source bus slave are replaced in FIG. 6. That is, in the memory map 70, the memory area 72 is allocated to the destination bus slave 15 and the memory area 71 is allocated to the source bus slave 12.

Next, a method of controlling the bus connection circuit according to the third embodiment of the present invention (the operation of the bus connection circuit (semiconductor device)) will be described.

At the timing of T1, the CPU 10 carries out a write accesses to the mirror area of the destination bus slave 15 (issues a write request onto the bus circuit 11). That is, the CPU 10 sets the slave selection signal 40 to the high level and outputs the address signal 31. The address decoder 20 sets the source select signal 37 to the high level based on the slave selection signal 40 and the address signal 31 and issues a write access request to the destination bus slave 15 selected based on the address signal 31.

At the timing of T2, the CPU 10 sets the transfer enable signal 34 to the high level. The direct transfer read strobe signal generating circuit 63 detects the access to the mirror area and sets the direct transfer read strobe signal 62 to the high level. Specifically, the direct transfer read strobe signal generating circuit 63 generates the direct transfer read strobe signal 62 based on the address signal 31, the destination select signal 37 and the transfer enable signal 34. At this time, the source select signal 37 is in the high level and the transfer enable signal 34 is in the high level. When the decoding result of the bits [5:4] of the address signal 31 showing the mirror area by the address decoder 23 becomes the high level, the direct transfer read strobe signal 62 becomes the high level.

When the direct transfer read strobe signal 62 is in the high level, the selector 61 sets the source select signal 30 and the transfer enable signal 34 active, and sets the address signal 31 to the value preset in the selector 61 to output to the source bus slave 12. The source bus slave 12 outputs the source read data 33 from the area specified by the address signal 31.

When the direct transfer read strobe signal 62 is in the high level and the destination select signal 37 is in the high level, the selector 60 outputs the source read data 33 as the CPU read data 39 (for example, connects the interconnection for read data 33 with the interconnection for the CPU read data 39). The source read data 33 becomes a read response. When the direct transfer read strobe signal 62 is in the high level, the write data selector 21 sets the CPU read data 39 as the slave write data 32 (for example, connects the interconnection for the CPU read data 39 with the interconnection for the slave write data 32).

The destination bus slave 15 can write the slave write data 32 based on the destination select signal 37, the transfer enable signal 34, the write strobe signal 41 and the address signal 31 (write access of the CPU 10).

In the present embodiment, the same effect as in the first embodiment can be obtained. Also, in this case, a modification example like the first embodiment is possible. Also, in case of the second embodiment, the write-read conversion circuit 55 becomes unnecessary. Also, because the configuration is adopted in which a read access to the source bus slave 12 is carried out from the destination bus slave 15 by detecting the write instruction, the CPU 10 can control an address (write destination address) which the destination bus slave 15 accesses.

As described above, another additional instruction (operation) can be incorporated into the instruction of the write access to the mirror area. For example, in the above embodiment, "the direct transfer" can be further incorporated into the write access. That is, the other additional instruction (operation) can be carried out in addition to a mere read access or write access, by changing the address signal (specification of the mirror area) without any additional setting at all.

As described above, according to the above embodiments, even if a case (1-cycle transfer) and a case of non direct transfer (for example, 2-cycle transfer) are mixed, the 1-cycle transfer is made possible without addition of setting such as memory controller setting.

Also, according to the above embodiments, another additional instruction (operation) can be incorporated into the read access or write access to the mirror area. For example, in the above embodiments, "the direct transfer" is incorporated into the read access (FIG. 5), "the destination selection" and "the direct transfer" are incorporated into the read access (FIG. 8), "the conversion of the write access into the read access" and "the direct transfer" are incorporated into the write access (FIG. 9, FIG. 10), and "the direct transfer" is incorporated into the write access (FIG. 13). That is, it is made possible to execute the other additional instruction (operation) in addition to the read access or write access, by changing the address signal (specification of the mirror area) without any additional setting at all.

As another additional instruction (operations) to be incorporated into the access instruction to the mirror area, various instructions are thought of in addition to the examples of the above embodiments. That is, for example, the direct transfer write strobe signal 35 in the first embodiment can be used for the various use purposes. Here, the direct transfer write strobe signal 35 is called a mirror area detection signal. The mirror area detection signal is a signal set to the high level when an access to the mirror area is detected.

The mirror area detection signal is supplied to the bus slave, and the register interface circuit of the bus slave is controlled based on the mirror area detection signal. Thus, a write access to a read only register in the bus slave is made possible. For example, at this time, the address signal is an address of the read only register+the mirror area (corresponding to an instruction which write-accesses to the read only register). Generally, the access to the register becomes necessary for the mode setting (change) but in the present invention, it is unnecessary.

The mirror area detection signal is supplied to the bus slave and the register interface circuit of the bus slave is controlled based on the mirror area detection signal. Thus, the write only register in the bus slave can be read. For example, at this time, the address signal is an address of the write only register+the mirror area (corresponding to an instruction which reads the write only register). Generally, the register access becomes necessary for the mode setting (change), but in the present invention, it is unnecessary.

The mirror area detection signal is supplied to the bus slave and the register interface circuit of the bus slave is controlled based on the mirror area detection signal. Thus, the value of a hiding register of the bus slave (it is possible to read 0 regardless of the register value even if it leads) can be read. For example, at this time, the address signal is an address of the hiding register+the mirror area (corresponding to an instruction which reads the hiding register). Generally, the register access becomes necessary for the mode setting (change), but in the present invention, it is unnecessary.

The mirror area detection signal is supplied to the bus slave and the connection of the read data/write data of the bus slave is changed based on the mirror area detection signal. Thus, endian of the read data/write data becomes able to be changed. For example, at this time, the address signal is an address of the read data/write data+the mirror area (corresponding to an instruction which changes the connection of the read data/write data). Generally, the register access becomes necessary for the mode setting (change), but in the present invention, it is unnecessary.

The mirror area detection signal is supplied to the bus slave, and a type conversion circuit connected with the read data/write data of the bus slave is controlled based on the mirror area detection signal. Thus, the type change (signed/unsigned, fixed point-floating point) of the read data/write data is made possible. For example, at this time, the address signal shows an address of the read data or write data+the mirror area (corresponding to type conversion instruction of the read data/write data). Generally, the register access becomes necessary for the mode setting (change) but in the present invention, it is unnecessary.

The mirror area detection signal is supplied to the bus slave, and the register interface circuit of the bus slave is controlled based on the mirror area detection signal. Thus, the packing of the read data/write data becomes possible (accessing a plurality of byte data at once). For example, at this time, the address signal shows an address of the read data or write data+the mirror area (corresponding to a packing instruction of the read data/write data). Generally, the register access becomes necessary for the mode setting (change), but in the present invention, it is unnecessary.

The mirror area detection signal is supplied to the bus slave, and an image format conversion circuit connected with the read data/write data of the bus slave is controlled based on the mirror area detection signal. Thus, the image format conversion of the read data/write data (YUV 422, YUV 420, YUV 411, RGB etc.) becomes possible. For example, at this time, the address signal shows an address of the read data or write data+the mirror area (corresponding to the image format conversion instruction of the read data/write data).

By supplying the mirror area detection signal to the bus slave, the function of the bus slave can be changed (ex. the output format is changed every mirror area in case of the transmission FIFO area of UART) based on the mirror area detection signal. For example, at this time, the address signal is an address of the bus slave+the mirror area (corresponding to the instruction which changes a function). Generally, the register access becomes necessary for the mode setting (change), but in the present invention, it is unnecessary.

The present invention is not limited to the above embodiments. A modification without departing the scope or spirit of the present invention is contained in the present invention. Also, the embodiments may be combined in a range of no technical contradiction.

The present invention has been described with reference to the above embodiments. However, they are only provided for description of the present invention and must not depend to interpret the claim.

What is claimed is:

1. A bus connection circuit which connects a bus master and a plurality of bus slaves, comprising:
    a mirror area access detecting circuit configured to detect that said bus master accesses a mirror area of a first bus slave of said plurality of bus slaves, and output a detection signal based on a detection result; and
    a processing circuit configured to execute preset processing to an area or data as an access object, the preset processing corresponding to the detection result.

2. The bus connection circuit according to claim 1, wherein said mirror area access detection circuit detects an access to said mirror area of a source bus slave as said first bus slave and outputs the detection signal, and
    wherein said processing circuit transfers read data from a source bus slave based on the access to a destination bus slave of said plurality of bus slaves without passing through said bus master, as the processing corresponding to the detection result.

3. The bus connection circuit according to claim 2, wherein said processing circuit comprises:
    a first selector configured to output the read data onto a write data output line from said bus master in response to the detection signal, without passing through said bus master; and
    a second selector configured to supply the read data on said write data output line, a preset address and the transfer enable signal to said destination bus slave in response to the detection signal, and
    wherein the read data is stored in the preset address of said destination bus slave.

4. The bus connection circuit according to claim 2, wherein said bus master sets an access to said mirror area of said source bus slave and a write request in case of direct transfer from said source bus slave to said destination bus slave, and
    wherein said processing circuit further comprises a write-read conversion circuit configured to convert the write request into a read request, when detecting the access to said mirror area of said source bus slave from said bus master.

5. The bus connection circuit according to claim 1, wherein said mirror area access detection circuit detects the access to said mirror area of a destination bus slave as said first bus slave and outputs the detection signal, and
wherein said processing circuit carries out access of a predetermined area of said source bus slave of said plurality of bus slaves as the preset processing corresponding to the detection result based on said detection result and transfers read data which is obtained based on the access, to a destination bus slave without passing through said bus master.

6. The bus connection circuit according to claim 5, wherein said processing circuit comprises:
a second selector configured to access the predetermined area of said source bus slave in response to the detection signal, such that said source bus slave outputs the read data; and
a first selector configured to output the read data onto said write data output line without passing through said bus master, and
wherein the read data is stored in said mirror area of said destination bus slave.

7. A semiconductor device comprising:
a bus master;
a plurality of bus slaves;
a bus connection circuit configured to connect said bus master and said plurality of bus slaves,
wherein said bus connection circuit comprises:
a mirror area access detecting circuit configured to detect that said bus master accesses a mirror area of a first bus slave of said plurality of bus slaves, and output a detection signal based on a detection result; and
a processing circuit configured to execute preset processing to an area or data as an access object, the preset processing corresponding to the detection result.

8. The semiconductor device according to claim 7, wherein said mirror area access detection circuit detects an access to said mirror area of a source bus slave as said first bus slave and outputs the detection signal, and
wherein said processing circuit transfers read data from a source bus slave based on the access to a destination bus slave of said plurality of bus slaves without passing through said bus master, as the processing corresponding to the detection result.

9. The semiconductor device according to claim 8, wherein said processing circuit comprises:
a first selector configured to output the read data onto a write data output line from said bus master in response to the detection signal, without passing through said bus master; and
a second selector configured to supply the read data on said write data output line, a preset address and the transfer enable signal to said destination bus slave in response to the detection signal, and
wherein the read data is stored in the preset address of said destination bus slave.

10. The semiconductor device according to claim 8, wherein said bus master sets an access to said mirror area of said source bus slave and a write request in case of direct transfer from said source bus slave to said destination bus slave, and wherein said processing circuit further comprises a write-read conversion circuit configured to convert the write request into a read request, when detecting the access to said mirror area of said source bus slave from said bus master.

11. The semiconductor device according to claim 7, wherein said mirror area access detection circuit detects the access to said mirror area of a destination bus slave as said first bus slave and outputs the detection signal, and
wherein said processing circuit carries out access of a predetermined area of said source bus slave of said plurality of bus slaves as the preset processing corresponding to the detection result based on said detection result and transfers read data which is obtained based on the access, to a destination bus slave without passing through said bus master.

12. The semiconductor device according to claim 11, wherein said processing circuit comprises:
a second selector configured to access the predetermined area of said source bus slave in response to the detection signal, such that said source bus slave outputs the read data; and
a first selector configured to output the read data onto said write data output line without passing through said bus master, and
wherein the read data is stored in said mirror area of said destination bus slave.

13. An operation method of a bus connection circuit, which connects a bus master and a plurality of bus slaves, said operation method comprising:
detecting that said bus master accesses a mirror area of a first bus slave of said plurality of bus slaves and outputting a detection signal;
executing preset processing to an area or data as an access object, the preset processing corresponding to the detection result.

14. The operation method according to claim 13, wherein said outputting a detection signal comprises:
detecting the access to said mirror area of a source bus slave as said first bus slave and outputting the detection signal,
wherein said executing preset processing comprises:
transferring read data based on the access and obtained from said source bus slave to a destination bus slave of said plurality of bus slaves without passing through said bus master, as the preset processing corresponding to the detection result, based on the detection result.

15. The operation method according to claim 14, wherein said executing preset processing comprises:
outputting the read data to a write data output line without passing through said bus master, in response to the detection signal; and
supplying the read data on said write data output line, a preset address and a transfer enable signal to said destination bus slave in response to the detection signal; and
storing the read data in the preset address of said destination bus slave.

16. The operation method according to claim 14, further comprising:
setting the access to said mirror area of said source bus slave and a write request when said bus master carries out the direct transfer from said source bus slave to said destination bus slave,
wherein said executing preset processing further comprises:
converting the write request to the read request when detecting the access to said mirror area of said source bus slave from said bus master.

17. The operation method according to claim 13, wherein said outputting a detection signal comprises:
- detecting the access to said mirror area of said destination bus slave as said first bus slave and outputting the detection signal, and wherein said executing preset processing comprises:
- accessing a predetermined area of said source bus slave of said plurality of bus slaves as the preset processing corresponding to the detection result based on the detection result, and transferring the read data which is based on the access, to said destination bus slave without passing through said bus master.

18. The operation method according to claim 17, wherein said executing preset processing comprises:
- accessing the predetermined area of said source bus slave in response to said detection signal, such that the read data is outputted to said source bus slave;
- outputting the read data onto a write data output line from said bus master without passing through said bus master; and
- storing the read data in said mirror area of said destination bus slave.

* * * * *